United States Patent
Heatley et al.

(10) Patent No.: US 11,539,233 B2
(45) Date of Patent: Dec. 27, 2022

(54) SMART BATTERY BACKUP SYSTEM

(71) Applicant: Splice Energy Solutions, LLC, McHenry, IL (US)

(72) Inventors: Nolan C. Heatley, McHenry, IL (US); Steven J. Bach, McHenry, IL (US)

(73) Assignee: Splice Energy Solutions, LLC, McHenry, IL (US)

( * ) Notice: Subject to any disclaimer, the term of this patent is extended or adjusted under 35 U.S.C. 154(b) by 301 days.

(21) Appl. No.: 16/885,863

(22) Filed: May 28, 2020

(65) Prior Publication Data

US 2020/0376982 A1 Dec. 3, 2020

Related U.S. Application Data

(60) Provisional application No. 62/854,626, filed on May 30, 2019.

(51) Int. Cl.
*H02J 7/00* (2006.01)
*H02J 7/34* (2006.01)
(Continued)

(52) U.S. Cl.
CPC .............. *H02J 7/342* (2020.01); *B60L 58/13* (2019.02); *B60L 58/19* (2019.02); (Continued)

(58) Field of Classification Search
CPC .......... H01M 10/0525; H01M 2220/20; H02J 7/0048; H02J 7/342; H02J 7/0068; (Continued)

(56) References Cited

U.S. PATENT DOCUMENTS

| 4,309,644 | A | 1/1982 | Reimers et al. |
| 5,002,840 | A | 3/1991 | Klebenow et al. |

(Continued)

FOREIGN PATENT DOCUMENTS

| CN | 105449785 A | 3/2016 |
| CN | 105449787 A | 3/2016 |

(Continued)

OTHER PUBLICATIONS

International Search Report and Written Opinion dated Aug. 20, 2020 issued in connection with International Application No. PCT/US2020/035561, filed on Jun. 1, 2020.

*Primary Examiner* — Zixuan Zhou
(74) *Attorney, Agent, or Firm* — McDonnell Boehnen Hulbert & Berghoff LLP

(57) ABSTRACT

In an example, a smart battery backup system is disclosed. The system is configured to be installed on or within a vehicle and connected to a main battery of the vehicle. The system includes a housing, a lithium-ion battery disposed at least partially within the housing, and a controller disposed at least partially within the housing and including a set of momentary switches. The controller is configured to jump start the main battery using the lithium-ion battery. The controller is also configured to maintain the lithium-ion battery such that, based on a charge state of the lithium-ion battery and a charge state of the main battery, the lithium-ion battery is charged using the main battery.

20 Claims, 4 Drawing Sheets

(51) Int. Cl.
*B60L 58/13* (2019.01)
*H01M 10/0525* (2010.01)
*F02N 11/08* (2006.01)
*B60L 58/19* (2019.01)

(52) U.S. Cl.
CPC ..... *F02N 11/0866* (2013.01); *H01M 10/0525* (2013.01); *H02J 7/0048* (2020.01); *H02J 7/0068* (2013.01); *B60L 2240/547* (2013.01); *H01M 2220/20* (2013.01)

(58) Field of Classification Search
CPC .... B60L 58/13; B60L 58/19; B60L 2240/547; F02N 11/0866
USPC ............................ 320/103–104, 109; 701/22

See application file for complete search history.

(56) References Cited

U.S. PATENT DOCUMENTS

| | | | |
|---|---|---|---|
| 5,488,283 A | 1/1996 | Dougherty et al. | |
| 2008/0238356 A1* | 10/2008 | Batson | H02J 7/04 320/103 |
| 2013/0106357 A1 | 5/2013 | Girard et al. | |
| 2016/0049819 A1* | 2/2016 | Butler | B60L 58/25 320/105 |
| 2016/0297311 A1* | 10/2016 | Butler | H02M 3/155 |
| 2017/0331162 A1* | 11/2017 | Clarke | H02J 7/0049 |
| 2018/0111491 A1 | 4/2018 | Nook et al. | |

FOREIGN PATENT DOCUMENTS

| | | |
|---|---|---|
| CN | 105680505 A | 6/2016 |
| CN | 205389117 U | 7/2016 |
| CN | 106166990 A | 11/2016 |
| CN | 205725084 U | 11/2016 |
| CN | 108923533 A | 11/2018 |

\* cited by examiner

SMART BATTERY BACKUP SYSTEM

This disclosure claims priority to U.S. Provisional Pat. App. No. 62/854,626 filed May 30, 2019, which is hereby incorporated by reference herein in its entirety.

BACKGROUND

In vehicles such as automobiles, various existing battery backup systems (also referred to herein as "backup systems," for short) can be used to provide backup power to the vehicle in the event that the vehicle's main battery is depleted or otherwise unable to provide power as desired. For example, some existing backup systems includes a battery jumper pack and the main battery disposed within a single housing. As another example, some existing backup systems include a portable, rechargeable lithium-ion battery pack (sometimes referred to as a "jump pack") capable of jump starting the vehicle's main battery. Jump packs typically include a pair of electrical connector cables or other equipment for creating a temporary electrical connection between the jump pack's battery and the vehicle's main battery, such as a metal clips having jaws (e.g., alligator clips) that temporarily connect to the main battery's terminals. Upon completion of providing the desired charge to the main battery using the jump pack, the jump pack is then disconnected from the main battery.

However, there can be certain disadvantages of utilizing existing backup systems such as these. For example, at least some existing backup systems might be expensive, complex, or more susceptible to malfunction. As another example, at least some existing backup systems might risk voiding manufacturers' warranties. As yet another example, at least some existing backup systems are designed with limited battery sizes and thus can be used only in certain vehicles. And as yet another example, at least some existing backup systems need to be manually maintained by a user (e.g., charged regularly, as well as manually connected/disconnected on a repeated basis).

Accordingly, a more efficient, less costly, and versatile backup system is desired.

SUMMARY

In one aspect, a system is disclosed. The system includes a housing. The system further includes a lithium-ion battery disposed at least partially within the housing, where the housing defines a plurality of first charging ports configured to receive a plurality of first cables that connect the lithium-ion battery to a main battery of a vehicle. The system further includes a controller disposed at least partially within the housing and including a set of momentary switches and a charging switch. The set of momentary switches are configured such that, when the set of momentary switches are activated, the set of momentary switches connect the lithium-ion battery in parallel with the main battery. The charging switch is configured such that, when the charging switch is activated, the charging switch connects the lithium-ion battery to the main battery. The controller is configured to perform a set of jump-starting operations. The set of jump-starting operations include receiving a signal indicative of activation of the set of momentary switches, and in response to receiving the signal, and within a predetermined startup window from receiving the signal, jump starting the main battery using the lithium-ion battery. The controller is also configured to perform a set of self-maintaining operations. The set of self-maintaining operations include determining that a charge state of the lithium-ion battery is below a first predetermined system threshold, determining that a charge state of the main battery exceeds a first predetermined vehicle threshold, and in response to determining that the charge state of the lithium-ion battery is below the first predetermined system threshold and determining that the charge state of the main battery exceeds the first predetermined vehicle threshold, automatically activating the charging switch to connect the lithium-ion battery to the main battery and charging the lithium-ion battery using the main battery.

In another aspect, a system is disclosed. The system includes a housing. The system further includes a lithium-ion battery disposed at least partially within the housing, where the housing defines a plurality of first charging ports configured to receive a plurality of first cables that connect the lithium-ion battery to a main battery of a vehicle, and where the housing further defines a second charging port configured to receive a second cable that connects the lithium-ion battery to an external power source and electrically couples the main battery to the external power source via the system. The system further includes a controller disposed at least partially within the housing and including a set of momentary switches. The set of momentary switches are configured such that, when the set of momentary switches are activated, the set of momentary switches connect the lithium-ion battery in parallel with the main battery. The controller is configured to perform a set of jump-starting operations. The set of jump-starting operations include receiving a signal indicative of activation of the set of momentary switches, and in response to receiving the signal, and within a predetermined startup window from receiving the signal, jump starting the main battery using the lithium-ion battery. The controller is further configured to trickle charge the main battery using the external power source.

In another aspect, a system is disclosed. The system includes a housing. The system further includes a lithium-ion battery disposed at least partially within the housing, where the housing defines a plurality of first charging ports configured to receive a plurality of first cables that connect the lithium-ion battery to a main battery of a vehicle, and where the housing further defines a second charging port configured to receive a second cable that connects the lithium-ion battery to an external power source and electrically couples the main battery to the external power source via the system. The system further includes a controller disposed at least partially within the housing and including a charging switch. The charging switch is configured such that, when the charging switch is activated, the charging switch connects the lithium-ion battery to the main battery. The controller is configured to perform a set of self-maintaining operations. The set of self-maintaining operations include determining that a charge state of the lithium-ion battery is below a first predetermined system threshold, determining that a charge state of the main battery exceeds a first predetermined vehicle threshold, and in response to determining that the charge state of the lithium-ion battery is below the first predetermined system threshold and determining that the charge state of the main battery exceeds the first predetermined vehicle threshold, automatically activating the charging switch to connect the lithium-ion battery to the main battery and charging the lithium-ion battery using the main battery. The controller is further configured to trickle charge the main battery using the external power source.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 1:
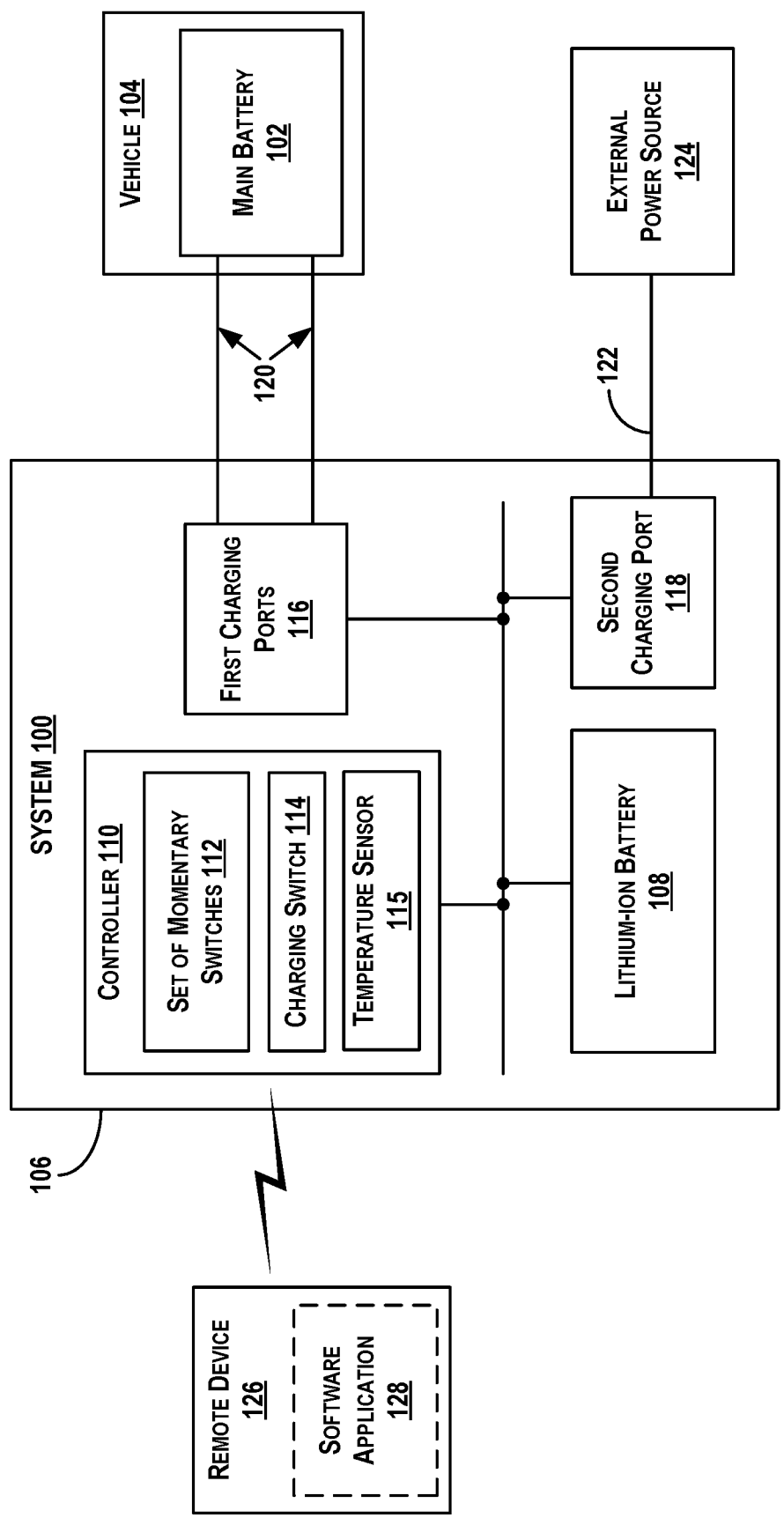
FIG. 1 is a block diagram representing a smart battery backup system configured to connect to a main battery of a vehicle, in accordance with an example embodiment.

FIG. 1 is a block diagram representing a smart battery backup system 100 (hereinafter referred to as "system 100") configured to connect to a main battery 102 of a vehicle 104, in accordance with an example embodiment. As shown, the system 100 can include a housing 106. The system 100 can also include a lithium-ion battery 108 and a controller 110, each of which can be at least partially disposed within the housing 106 or at least partially attached on an exterior the housing 106. The controller 110 can include a set of momentary switches 112, a charging switch 114, and a temperature sensor 115.

The housing 106 can define a plurality of first charging ports 116. The housing 106 can also define a second charging port 118. The plurality of first charging ports 116 can be configured to receive a plurality of first cables 120 that connect the lithium-ion battery 108, and thereby, the system 100, to the main battery 102 of the vehicle 104. The second charging port 118 can be configured to receive a second cable 122 that connects the lithium-ion battery 108, and thereby, the system 100, to an external power source 124. As further shown, the controller 110, and thus, the system 100, can be in communication with a remote device 126.

The main battery 102 can be a rechargeable battery configured to supply current to the vehicle 104. The main battery 102 can take various forms, depending on the type of the vehicle 104.

The vehicle 104 can be one of a variety of different types of vehicles, such as a car, truck, lawnmower, golf cart or other sports-related vehicle, or marine-based vehicle (e.g., a boat), among many other possibilities. As such, the main battery 102 of the vehicle 104 can be a standard battery commonly found in the vehicle 104, or can instead be a separate battery that was installed to replace the battery that is typically included with the vehicle 104.

The housing 106 can be comprised of plastic and/or other materials. In some embodiments, the housing 106 can include, in addition to the components discussed above, one or more physical structures that enable the system 100 to be mounted or otherwise affixed to one or more surfaces within the vehicle 104 when the system 100 is installed in or on the vehicle 104. Additionally or alternatively, the system 100 can be affixed to the vehicle 104 via push pins, clamps, adhesives, or other mounting techniques/mechanisms. The location at which the system 100 is mounted in or on the vehicle 104 can vary depending on the location of the main battery 102 and/or depending on the layout and configuration of the vehicle 104 itself (e.g., how much space is available for mounting, how far the mounting space is from the main battery 102, etc.). For instance, the system 100 can be mounted under the dashboard (e.g., under the glove compartment on the passenger side), in the glove compartment, in the trunk of the vehicle 104, or under the hood of the vehicle 104, among other possible locations.

The lithium-ion battery 108 can be a rechargeable battery to and from which current can flow during charging of the lithium-ion battery 108 and discharging of the lithium-ion battery 108. Although embodiments herein are described as including a lithium-ion battery, it should be understood that, in other embodiments, the system 100 could include other types of batteries additionally or alternatively to a lithium-ion battery. The size of the lithium-ion battery 108, and perhaps additionally the size of the housing 106 and/or the controller 110, can vary depending on the type of vehicle 104. For instance, the lithium-ion battery 108 and/or the controller 110 might be physically larger and/or more powerful for implementations of the system 100 that are used for larger vehicles such as semi-trucks than for those used for smaller vehicles such as sports cars.

The controller 110 can be or include one or more processors and/or other electronic components that facilitate control of operations performed by the system 100, including but not limited to the operations described herein. The controller 110 can take various forms, such as that of a printed circuit board assembly. In implementations where the controller 110 includes a processor, such a processor can be a general-purpose processor or special purpose processor (e.g., a digital signal processor, application specific integrated circuit, etc.).

In some implementations, the controller 110 can include memory as well, which can take the form of one or more computer-readable storage media, such as non-transitory computer-readable media, that can be read or accessed by the processor. The computer-readable storage media can include volatile and/or non-volatile storage components, such as optical, magnetic, organic or other memory or disc storage, which can be integrated in whole or in part with the processor. The memory can store instructions (e.g., computer-readable program instructions including computer executable code) and the processor can be configured to execute those instructions to cause the controller 110 to perform various operations described herein.

The memory can store other data as well in addition to executable instructions, such as temperature data acquired by the temperature sensor 115, a current or previous charge state of the lithium-ion battery 108, a current or previous charge state of the main battery 102, and/or usage counter data such as (i) how many times the system 100 has been powered on, (ii) a total time during which the system 100 has been powered on, (iii) how many times one or more of the jump starting operations have been performed, and/or (iv) how many times one or more of the self-maintaining operations have been performed.

In some examples, the memory can be implemented using a single physical device (e.g., one optical, magnetic, organic or other memory or disc storage unit), while in other examples, the memory can be implemented using two or more physical devices.

In other implementations, the set of momentary switches 112, the charging switch 114, and/or other parts of the controller 110 can include additional or alternative components as well, such as a relay that enables or disables current flow between the lithium-ion battery 108 and the main battery 102.

The set of momentary switches 112 can be or include one or more momentary switches and associated circuitry, each of which can take the form of a physical mechanical switch or a solid state switch that is configured such that, when activated, the momentary switch electrically connects the lithium-ion battery 108 of the system 100 in parallel with the main battery 102 of the vehicle 104. In some implementations, when such a switch is activated, activation of the switch can trigger a time-delayed relay, which connects the lithium-ion battery 108 in parallel with the main battery 102 for a predetermined duration of time (e.g., thirty seconds), during which the lithium-ion battery 108 can jump start the main battery 102. If the controller 110 detects that the lithium-ion battery 108 is insufficiently charged (e.g., has charge state that is below a predetermined threshold) or otherwise becomes insufficiently charged before the predetermined duration of time expires, the controller 110 might shut the system 100 off or perform another action. Further, in some implementations, the set of momentary switches 112 can include multiple switches for redundancy purposes in the event that one or more of them becomes inoperable.

In some examples, one or more momentary switches of the set of momentary switches 112 can be or include a switch configured to be remotely and wirelessly activated, such as by way of radio frequency signals (e.g., radio waves used for radio-frequency identification (RFID), Bluetooth® communication, or other wireless technology standards). Additionally or alternatively, in some examples, one or more momentary switches of the set of momentary switches 112 can be or include a switch configured to be manually activated. For example, one such switch can be or include a push button switch disposed at least partially within the housing 106 or located remotely from the housing 106 but physically connected to the rest of the controller 110 (e.g., via a wire or group of wires). Other examples are possible as well. A manually-activated switch can be advantageous in various situations, such as when a remote control for the remotely-activated switch(es) is nonfunctional or misplaced. In some implementations, one or more momentary switches of the set of momentary switches 112 can be integrated into a printed circuit board of the controller 110, or otherwise integrated with the controller 110. It should be understood that the system 100 can be additionally or alternatively configured such that any one or more of the set of momentary switches 112, when activated, can initiate the performance of other operations described herein, such as trickle charging, maintaining the main battery 102, and/or the lithium-ion battery 108 maintaining itself.

In some arrangements, the controller 110 can include at least one switch that, when activated, does not connect the lithium-ion battery 108 to the main battery 102, and at least one other switch that, when activated after the system 100 is turned on, connects the lithium-ion battery 108 to the main battery 102. To facilitate operation of certain types of momentary switches, the system 100 can include additional components. For example, if a Bluetooth® switch is present, the system 100—or, more particularly, the controller 110—can include a wireless communication module configured to receive a Bluetooth® signal and responsively activate or deactivate the Bluetooth® switch. Other examples are possible as well.

The charging switch 114 can be or include one or more switches and associated circuitry that is/are integrated into a printed circuit board of the controller 110, or otherwise integrated with the controller 110, and that facilitate electrically connecting the lithium-ion battery 108 to the main battery 102 or the external power source 124 so the controller 110 can charge the lithium-ion battery using the main battery 102 or the external power source 124. As an example, the charging switch 114 can be or include a 12.5 volt (V) charging switch and associated circuitry. Further, the charging switch 114 can be configured such that, when activated (e.g., automatically by the controller 110 in response to the controller 110 determining that the lithium-ion battery 108 has a charge state that is below a predetermined threshold), the charging switch 114 connects the lithium-ion battery 108 to the main battery 102, thus facilitating charging of the lithium-ion battery 108 off the main battery 102. When the charging switch 114 is deactivated (e.g., by the controller 110 in response to the controller 110 determining that a charge state of the lithium-ion battery 108 reaches a predetermined threshold, or in response to the charge state of the main battery 102 reaching or falling below a predetermined deactivation threshold), the charging switch 114 can disconnect the lithium-ion battery 108 from the main battery 102. In some implementations, the charging switch 114, when activated, can connect the external power source 124 to the main battery 102 to facilitate trickle charging the main battery 102. In other implementations, another switch or switches and associated circuitry, separate from the charging switch 114, can be integrated with the controller 110 and dedicated for use in connecting the external power source 124 to the main battery 102.

It should be noted that, in some embodiments, the set of momentary switches 112 can be associated with a different type of charging than the charging switch 114. In particular, activation of one or more momentary switches of the set of momentary switches 112 can trigger the operations of the controller 110 related to jump starting the main battery 102 using the lithium-ion battery 108. By contrast, activation of the charging switch 114 can trigger operations of the controller 110 in which the lithium-ion battery 108 is charged off of the main battery 102 via the plurality of first cables 120, but in which the lithium-ion battery 108 is not supplying current to charge the main battery 102 and is not connected in parallel with the main battery 102. Thus, the connection between the lithium-ion battery 108 and the main battery 102 triggered by the activation of the charging switch 114 can be different from the connection between the lithium-ion battery 108 and the main battery 102 triggered by the activation of one or more momentary switches of the set of momentary switches 112.

The temperature sensor 115 can be or include a thermocouple, thermopile, thermistor, and/or associated circuitry configured for sending signals to the controller 110 that indicate one or more temperature levels within the system 100, such as a temperature of the lithium-ion battery 108. In an exemplary example, if the controller 110 receives a signal that indicates that a temperature of the lithium-ion battery 108 is outside of a predetermined range (e.g., below −20 degrees Celsius or above 60 degrees Celsius), the controller 110 can responsively not allow the system 100 to be turned on so that the lithium-ion battery 108 cannot connect to the main battery 102 and/or the external power source 124. Alternatively, if the lithium-ion battery 108 is currently connected to the main battery 102 and/or the external power source 124, disconnect the lithium-ion battery 108 from the main battery 102 and/or the external power source 124. Thus, the system 100 can help keep itself at a safe operating temperature. Other examples are possible as well.

In addition to the set of momentary switches 112, the charging switch 114, and the temperature sensor 115, the controller 110 can include a unidirectional charging circuit that can connect the lithium-ion battery 108 in parallel with the main battery 102 to allow for jump starting (or otherwise providing charge to) the main battery 102. The controller 110 (i.e., the circuits thereof) can be designed such that current can flow to and from the lithium-ion battery 108, but also such that, in some situations, drain of current from the lithium-ion battery 108 can be prevented. These and other operations performed by the controller 110 are described in more detail below.

The plurality of first charging ports 116 can be or include mechanical and electrical connectors configured to receive the plurality of first cables 120 and serve as a bridge between the main battery 102 and the system 100. For example, the plurality of first charging ports 116 can be a female connectors configured to receive ends of the plurality of first cables 120. Other examples are possible as well.

The second charging port 118 can be or include a mechanical and electrical connector configured to receive the second cable 122 and serve as a bridge between the external power source 124 and the system 100 such that the main battery 102 is electrically coupled to the external power source 124 via the system 100. For example, the second charging port 118 can be a female connector configured to receive one end of the second cable 122. Other examples are possible as well. The second charging port 118 can be configured to convert power from alternating current (AC) to direct current (DC) while also reducing the voltage to proper amperage for trickle charging.

The plurality of first cables 120 can be or include any wire or grouping of wires that hardwire, and thus electrically connect, the system 100 to the main battery 102 of the vehicle 104. Each of the plurality of first cables 120 can include a respective terminal (e.g., positive and negative) configured to connect to a respective corresponding terminal of the main battery 102. A variety of different accessories could be used to connect the plurality of first cables 120 to the terminals of the main battery 102, such as nuts/screws or ring terminals.

One advantage of the system 100 is that, rather than being a backup system such as a jump pack that is primarily intended for portable use, the system 100 can be affixed to the vehicle 104 in a more permanent manner. In particular, a user can connect the plurality of first cables 120 to the main battery 102 in such a way so that the user would not desire to disconnect the plurality of first cables 120 for a long period of time (e.g., weeks, months, or years). To that point, the mechanisms used to connect the system 100 to the main battery 102 can be more permanent (e.g., ring terminals, screws, etc.) than alligator clips or other types of mechanisms that are used for more temporary connections. In other words, the system 100 can be connected via ring terminals, screws, etc., and not by using alligator clips or other such mechanisms used for more temporary connections.

The second cable 122 can be or include any wire or grouping of wires that hardwire, and thus electrically connect, the system 100 to the external power source 124. For example, the second cable 122 can take the form of a 110 Volt (V) AC power cable. Other examples are possible as well.

The external power source 124 can be a device configured to supply electrical power, such as AC voltage, to the system 100. For example, the external power source 124 can take the form of a 110 V power outlet, such as an outlet found in a house or garage of a user of the system 100. Other examples are possible as well.

The remote device 126 can be an electronic computing device, possibly having a processor and memory (either of which can take the forms described above by way of example with respect to the controller 110). The remote device 126 can be used to remotely interact with the system 100 and components thereof. For example, the remote device 126 can be a wireless radio frequency controller configured with a button or other input device that, when triggered, causes radio frequency signals to be transmitted to the controller 110 (e.g., to activate a radio frequency-based switch of the controller 110) to cause the controller 110 to perform certain operations, such as initiating jump starting of the main battery 102 off of the lithium-ion battery 108. As another example, and as shown in FIG. 1, the remote device 126 can be a client device (e.g., a personal computer, smartphone, tablet computer, wearable computing device, or other computing device) having installed a software application 128 associated with the system 100. Using the software application 128, a user can make a selection that causes the remote device 126 to wirelessly (e.g., via Bluetooth®) activate the controller 110 (e.g., activate a Bluetooth® switch of the controller 110) to cause the controller 110 to perform certain operations, such as initiating jump starting of the main battery 102 off of the lithium-ion battery 108. The remote device 126 can take other forms as well, additionally or alternative to the forms described above.

Although not shown, the system 100 can include other components as well, additionally or alternatively to those described above. For example, the system 100 can include one or more light-emitting diodes (LEDs) configured to indicate a charge state of the lithium-ion battery 108. Other examples are possible as well.

The controller 110 can be configured to cause the system 100 to perform various operations, such as those related to jump starting the main battery of the vehicle 104, self-maintaining the lithium-ion battery 108, and trickle charging the main battery 102, thus integrating jump starting, self-maintaining, and trickle charging functionality within the same housing. Examples of these operations will now be described.

The controller 110 can be configured to perform jump starting operations in which the lithium-ion battery 108 is used to provide a voltage boost to the main battery 102 of the vehicle 104 for a predetermined duration of time (e.g., somewhere between 30 seconds to 60 seconds) to start the vehicle 104.

In an example of this jump starting process, one or more switches of the set of momentary switches 112 can be activated, such as in one or more of the manners described above. Activation of the momentary switch(es) (e.g., receipt by the controller 110 of one or more signals indicative of the activation, such as a Bluetooth® signal) can trigger a time-delayed relay where, for a predetermined startup window of time (e.g., thirty seconds, or long enough for a user to start the vehicle), the controller 110 can connect the lithium-ion battery 108 in parallel with the main battery 102 via the plurality of first cables 120 and jump start the main battery 102 using the lithium-ion battery 108. The act of jump starting the main battery 102 can involve one or more attempts to jump start the main battery 102 within the predetermined startup window. The controller 110 can stop trying to jump start the main battery 102 in response to the controller 110 detecting that the vehicle 104 has started, such as by determining that the main battery 102 has exhibited a rise in voltage exceeding a particular threshold (e.g., 13 V to 14 V upon startup of the vehicle 104), or in response to the controller 110 detecting that the predetermined startup window has expired.

If, during the predetermined startup window, the controller 110 does not detect that the vehicle 104 is running, the predetermined startup window will expire and the set of momentary switches 112 might have to be reactivated to reinitiate jump starting of the vehicle 104. Further, if the user desires to connect the lithium-ion battery 108 in parallel again (e.g., because the vehicle did not start the first time), the controller 110 might not allow the connection to occur until after the predetermined startup window has expired, after which the lithium-ion battery 108 can again be connected via one or more of the momentary switches of the set of momentary switches 112.

In some implementations, the jump starting operations can involve the controller 110 monitoring a charge state (e.g., a voltage) of the main battery 102 and, when the controller 110 determines that the charge state has fallen below a predetermined charge drop threshold (e.g., approximately 12.5 V), the controller 110 can responsively transmit, to the remote device 126, an alert message (e.g., a text message, an audio notification, etc.) to notify a user of the remote device 126 that the main battery 102 is being depleted. In some examples, the alert message can be provided to the user via the software application 128 installed on the remote device 126.

In addition to the jump-starting operations, the controller 110 can be configured to perform self-maintaining operations on the system 100 itself. Namely, the controller 110 can cause the system 100 to charge itself off the main battery 102 via the plurality of first cables 120.

In an exemplary implementation, the controller 110 can be configured to perform at least a portion of the self-maintaining operations described herein on a continuous basis (e.g., as long as the system 100 has power), at predefined periodic intervals (e.g., every minute), and/or in response to detecting one or more specific trigger conditions, such as a trigger condition where the controller 110 determines that the main battery 102 has exhibited a rise in voltage exceeding a predetermined threshold (e.g., approximately 12.5 V). Thus, the system 100 can advantageously check (e.g., continuously, or periodically, etc.) to see if the main battery 102 (or the external power source 124, if such a source is connected to the system 100) has sufficient voltage that the system 100 can use to maintain a desirable consistent charge state of the lithium-ion battery 108 without leaving the main battery 102 with a less-than-desirable voltage. If the desired voltage is not available from the main battery 102 or the external power source 124, the controller 110 can wait for the vehicle 104 to be running and/or for the system 100 to be connected to the external power source 124. In some implementations, the self-maintaining operations described herein can be performed by the system 100 regardless of whether the vehicle is running, sitting idle, etc.

In an example of the self-maintaining operations, the controller 110 can determine a charge state of the lithium-ion battery 108. The controller 110 can also determine a charge state of the main battery 102 and/or determine whether the system 100 is connected to the external power source 124. If the controller 110 determines that the charge state of the lithium-ion battery 108 is below a first predetermined system threshold (e.g., below approximately 90% of the full capacity of the lithium-ion battery 108, or below approximately full capacity) and determines that the charge state of the main battery 102 exceeds a first predetermined vehicle threshold (e.g., exceeds 95% of the full capacity of the main battery 102), the controller 110 can responsively and automatically connect the lithium-ion battery 108 to the main battery 102 by activating the charging switch 114, thus permitting current flow from the main battery 102 to the lithium-ion battery 108, and charge the lithium-ion battery 108 via the plurality of first cables 120 and using the main battery 102.

Additionally or alternatively, if the controller 110 determines that the charge state of the lithium-ion battery 108 is below the first predetermined system threshold and determines that the system 100 is connected to the external power source 124, the controller 110 can responsively and automatically connect the lithium-ion battery 108 to the external power source 124 (e.g., by activating one or more switches, such as the charging switch 114 or a different switch, that connect the lithium-ion battery 108 to the external power source 124), thus permitting current flow from the external power source 124 to the lithium-ion battery 108, and charge the lithium-ion battery 108 via the second cable 122 and using the external power source 124. Further, in scenarios where the system 100 is connected to the external power source 124 and the charge state of the main battery 102 exceeds the first predetermined vehicle threshold, the controller 110 can be configured to prioritize charging the lithium-ion battery 108 directly using the external power source 124 instead of using the main battery 102. A self-maintaining operation using the external power source 124 can be particularly useful in scenarios where the vehicle 104 is being kept in a garage or other location for a long period of time or where the main battery 102 is otherwise not available or desirable for use in the self-maintaining of the system 100.

As noted above, the controller 110 can be configured in some implementations to determine the charge state of the lithium-ion battery 108, determine the charge state of the main battery 102, and/or determine whether the system 100 is connected to the external power source 124 in response to a trigger condition. As an example, the trigger condition can be the controller 110 determining that the main battery 102 has exhibited a rise in voltage exceeding a predetermined voltage rise threshold (e.g., approximately 12.5 V). Such a rise in voltage can correspond to a startup of the vehicle 104, thus indicating to the system 100 that the vehicle 104 is on and running. As another example, the trigger condition can be the controller 110 detecting that the system 100 has been plugged into the external power source 124. Other trigger conditions are possible as well.

In some implementations, the controller 110 can be configured to connect the lithium-ion battery 108 to the main battery 102 before determining the charge state of the lithium-ion battery 108. In such implementations, if the controller 110 determines that the charge state of the lithium-ion battery 108 is below the first predetermined system threshold and makes one or more of the other determinations described above, the controller 110 can responsively then maintain the connection and begin charging the lithium-ion battery 108 off the main battery 102. Whereas, if the controller 110 determines that the charge state of the lithium-ion battery 108 is not below the first predetermined system threshold, the controller 110 can responsively then disconnect from the main battery 102.

After the controller 110 has begun charging the lithium-ion battery 108 as described above, the controller 110 can keep charging the lithium-ion battery 108 until the controller 110 makes one or more determinations that indicate to the controller 110 that the controller 110 should stop charging the lithium-ion battery 108. Thus, one such determination or combination of such determinations can cause the controller 110 to responsively and automatically disconnect the lithium-ion battery 108 from the main battery 102 by deactivating the charging switch 114 and/or responsively and automatically stop charging the lithium-ion battery 108 using the external power source 124.

One example of such a determination can be the controller 110 determining that the charge state of the lithium-ion battery 108 exceeds a second predetermined system threshold (e.g., exceeds 95% of the full capacity of the lithium-ion battery 108) or has reached approximately a full charge to 100% of the full capacity.

Another example of such a determination can be the controller 110 determining that the charge state of the main battery 102 is below a second predetermined vehicle threshold (e.g., below 80% of the full capacity of the main battery 102). The first and second predetermined system thresholds can be the same or different, and the first and second predetermined vehicle thresholds can be the same or different.

Yet another example of such a determination can be the controller 110 determining that that system 100 has been disconnected from the external power source 124.

Yet another example of such a determination can be the controller 110 determining that the main battery 102 has exhibited a drop in voltage below the predetermined voltage drop threshold (e.g., the voltage of the main battery 102 has dropped below approximately 12.5 V), which can indicate that the vehicle 104 has turned off.

As a specific example of the self-maintaining operations, the controller 110, in determining when to disconnect and stop charging the lithium-ion battery 108, might be configured to consider only whether the charge state of the main battery 102 is below the second predetermined vehicle threshold. That is, even if the vehicle 104 is no longer running, the lithium-ion battery 108 can continue to charge off the main battery 102 until the controller 110 determines that the charge state of the main battery 102 is below the second predetermined vehicle threshold.

As another specific example of the self-maintaining operations, upon starting of the vehicle 104, the controller 110 might determine that the charge state of the lithium-ion battery 108 is below the first predetermined system threshold (e.g., below 90% charged), upon which the controller 110 can charge itself off of the main battery 102 until the controller 110 determines both (i) that system 100 has been disconnected from the external power source 124 and (ii) that the charge state of the main battery 102 is below the second predetermined vehicle threshold (e.g., 90% charged), in which case the controller 110 can automatically disconnect and stop charging. Other examples are possible as well.

As another specific example of the self-maintaining operations, when the vehicle 104 is not running, the controller 110 can determine whether the charge state of the main battery 102 is below the second predetermined vehicle threshold. If the charge state is below the second predetermined vehicle threshold, the controller 110 will not charge the lithium-ion battery 108 until it detects either that (i) the system 100 has been connected to the external power source 124 (in which case the controller 110 will initiate charging the lithium-ion battery 108 using the external power source 124) or (ii) that the charge state of the main battery 102 is above the second predetermined vehicle threshold (in which case the controller 110 will initiate the charging the lithium-ion battery 108 using the main battery 102).

By having the controller 110 configured to be able to automatically disconnect the system 100 from the main battery 102 in the manners discussed above, the system 100 can avoid over-charging the lithium-ion battery 108. This also allows the system 100 to act as a maintainer for the main battery 102 so that the main battery 102 is not over-depleted when the system 100 is self-maintaining and charging the lithium-ion 108 battery off the main battery 102. The system 100 can also isolate itself from the main battery 102 and thus prevent the lithium-ion battery 108 from being depleted by an electrical system or other components of the vehicle 104 during normal vehicle operation (e.g., when the vehicle is on, such as when moving or when sitting still with lights on).

Additionally or alternatively to the criteria described above, other criteria could be used in the self-maintaining operation to determine whether to charge the lithium-ion battery 108 or whether to discontinue charging the lithium-ion battery 108.

As so configured, the system 100 can effectively include a mechanism that is integrated within the housing 106 that the system 100 can use to automatically maintain the lithium-ion battery 108 at a desirable charge state while also maintaining the main battery 102 at a desirable charge state. Further, because the system 100 can be usefully affixed to the main battery 102 and the vehicle 104 in a more permanent manner than existing solutions, the self-maintaining functionality thus usefully becomes a more permanent capability of the system 100 that can be used with the vehicle 104 and/or the external power source 124 when desired.

In addition to the jump starting and self-maintaining operations described above, the controller 110 can also be configured to automatically trickle charge the main battery 102 as needed. That is, the controller 110 can be configured to charge the main battery 102 in response to determining that the charge state of the main battery 102 has fallen below a first predetermined trickle charging threshold (e.g., 80% of the full capacity of the main battery 102).

As noted above, the system 100 can facilitate trickle charging of the main battery 102 via a connection of the second cable 122 between the second charging port 118 and the external power source 124. The second charging port 118 can convert power from AC to DC while also reducing the voltage to proper amperage for the trickle charging (e.g., an amperage in the range of 100 milliamps to 200 milliamps). The controller 110 can include a circuit that connects the second charging port 118 to the plurality of first cables 120 so that current can flow from the external power source 124, through the second cable 122, the controller 110, and the plurality of first cables 120, to the main battery 102.

In a more specific example of trickle charging operations, the controller 110 can determine that the charge state of the main battery 102 has fallen below the first predetermined trickle charging threshold (e.g., below 80% of the full capacity of the main battery 102, or perhaps below approximately 100% of the full capacity) and responsively connect the main battery 102 to the external power source 124, such as by activating a switch in the circuitry of the controller 110 that is dedicated for use in activating or deactivating trickle charging functionality. The main battery 102 can thus be charged by the external power source 124 until the controller 110 determines that the charge state of the main battery 102 has reached a second predetermined trickle charging threshold (e.g., 95% of the full capacity of the main battery 102, or perhaps approximately 100%), in which case the controller 110 can responsively disconnect the external power source 124 from the main battery 102 (e.g., by deactivating a switch), thus discontinuing the charging. The controller 110 can thereafter continue to monitor the charge state of the main battery 102 and can be configured to automatically reconnect (e.g., by reactivating a switch) the external power source 124 to the main battery 102 in response to the controller 110 determining that the charge state of the main battery 102 has again dropped below the first predetermined trickle charging threshold, so as to help maintain the charge state of the main battery 102 at or above approximately the second predetermined trickle charging threshold. In some examples, as the main battery 102 charge state approaches an output voltage of the external power source 124 and gets closer to becoming fully charged, the current being supplied to the main battery 102 via the controller 110 will naturally decline to zero.

As so configured, the system 100 can effectively include an integrated trickle charger within the housing 106 that can be used to extend the battery life of the main battery 102 as needed, or to otherwise provide desired charge to the main battery 102. Further, because the system 100 can be usefully affixed to the main battery 102 and the vehicle 104 in a more permanent manner than existing solutions, the trickle charging functionality thus usefully becomes a more permanent capability of the system 100 that can be used with the vehicle 104 when desired.

In a preferred implementation, multiple components of the system 100 described above, including but not limited to the lithium-ion battery 108 and the controller 110, are all contained within the same housing 106, so that the system 100 is a single product that integrates the jump starting functionality, the self-maintaining functionality, and the trickle charging functionality described above. In other words, at least the controller 110 and the lithium-ion battery 108 are located only within the housing 106 and not located outside of the housing 106. In other exemplary implementations, the controller 110 and/or the lithium-ion battery 108 can be at least partially within the housing 106 with at least a portion (e.g., a few centimeters) of one or both of such components located outside the housing 106. In these and other preferred or exemplary implementations, the housing 106 is not the same as another type of housing that might be naturally present as part of the vehicle 104. That is, the housing 106 (and the system 100, for that matter), can be a separate single product that can be connected to the main battery 102 of the vehicle 104. Furthermore, as discussed above, preferred implementations for using the system 100 can involve fixedly attaching the system 100 within the vehicle 104, such as inside an engine compartment of a vehicle (e.g., under the hood of a vehicle, under a seat of the vehicle, in a trunk of a vehicle, etc.).

It should be understood that the act of disconnecting the lithium-ion battery 108 from the main battery 102 described herein, and thus discontinuing charging of the lithium-ion battery 108 using the main battery 102 or vice versa, can involve deactivating a switch (e.g., the set of momentary switches 112, the charging switch 114, and/or another switch of the controller 110 not explicitly illustrated herein) such that current does not flow between the lithium-ion battery 108 and the main battery 102, even if a physical connection remains between the system 100 and the main battery 102 (e.g., the plurality of first cables 120).

In some implementations, the system 100 can usefully interact with remote devices (e.g., remote device 126) in manners additionally or alternatively to the manners described above. The nature of these interactions and associated operations will now be described in more detail.

In an example, the controller 110 can connect to the main battery 102 to monitor a charge state of the main battery 102 and/or the lithium-ion battery 108 and transmit, to the remote device 126, an indication of the charge state during jump starting, self-maintaining, and/or trickle charging. Thus, by way of the remote device 126, a user of the remote device 126 can be kept up to date in real time as to the charge status during the jump starting, self-maintaining, and/or trickle charging operations. The remote device 126 can include a display device (e.g., a computer monitor, touchscreen, etc.) that can display the indication. The indication of the charge state can take various forms, such as a text message or email sent to, and displayed by, the remote device 126, possibly representing the charge status as a number percentage of the full capacity. Other indications can be provided to the remote device 126 as well, such as a current temperature of the lithium-ion battery 108 that is detected by the temperature sensor 115, and/or an indication that the temperature of the lithium-ion battery 108 is within or outside of a predefined range.

In implementations where the software application 128 is installed on the remote device 126, the software application 128 can provide a graphical user interface (GUI) that enables the user to view the charge status of the main battery 102 and/or the lithium-ion battery 108. The software application 128 can also enable the user to view the charge status of the main battery of other vehicles in or on which other systems similar to or identical to the system 100 have been installed.

The software application 128 and its user interface can provide other functionality to the user as well that assists the user with controlling operation of the system 100 and/or monitoring any of the information described herein that is determined by the controller 110, such as whether the system 100 is connected to the main battery 102, whether the vehicle 104 is running, how much of the predetermined startup window has expired, and/or a temperature of the lithium-ion battery 108, among other possibilities. More specific examples of this functionality will now be described in more detail.

In an example implementation, the software application 128 can enable the user to add or remove the system 100 from the memory of the remote device 126. For example, to add the system 100, the software application 128 can provide a page that prompts the user to scan a QR code or other readable code using a camera of the remote device 126 or to enter a registration code manually.

Once the system 100 is added, the software application 128 can provide various information to, or request various information from the user, which can be provided in a single page or multiple pages. Examples of this information can include a name/nickname for the system 100 (e.g., "My System") and/or details of the vehicle 104 (e.g., make, model, year, vehicle identification number, license plate number, stock, color).

The software application 128 can list all registered systems and display a status for each system, such as whether the system 100 is within range, out of range, or unavailable (e.g., if the remote device 126 is within range of the system

100, but the lithium-ion battery 108 is dead, the controller 110 or Bluetooth® module is experiencing an error, etc.). Other status information is possible as well, such as a charge status of the lithium-ion battery 108, a charge status of the main battery 102, a warning that the lithium-ion battery 108 and/or the main battery 102 will soon be depleted, and/or a status of the vehicle 104 (e.g., whether the vehicle 104 is running or not). The software application 128 can also display a date and time at which the status of the system 100 was last updated.

In some implementations, the software application 128 can provide a single GUI element on a page having its appearance (e.g., color) change depending on what operations are being performed or can be performed with respect to the system 100, and/or depending on whether the status of the system 100 is within range, out of range, out of a safe operating temperature range, etc. As an example the GUI element can, when selected, connect the remote device 126 to the controller 110, provided that the system 100 is within range. The GUI element and/or another part of the page can then display a connection status (e.g., a progress bar), as well as an indication as to whether the connection was successful or unsuccessful. After the connection (e.g., a wireless communication interface) is successfully established, the GUI element can enable the user to "swipe to start" a particular operation. As a more specific example, the user can swipe to start the jump starting operation, which causes the remote device 126 to transmit a signal to the controller 110 that, upon receipt by the controller 110, causes the controller 110 to responsively connect the main battery 102 in parallel with the lithium-ion battery 108 and jump start the vehicle 104. However, if the controller 110 does not detect that the vehicle 104 is running in the predetermined startup window, the controller 110 will stop trying to jump start the vehicle 104 and the user will have to swipe to start again to reinitiate the jump start process, thus restarting the predetermined startup window.

The software application 128 can also enable the user to share the system 100 with another user. This might occur, for instance, if the user sells the vehicle 104 (which has the system 100 installed), to the other user and seeks to relinquish control of the system 100 to the other user. To facilitate this, the software application 128 can provide a selectable option to initiate a transfer of the system 100 information and the vehicle 104 information to the other user. For instance, the software application 128 can generate a QR code that, when scanned by a remote device of the other user, can cause the information to be transferred to the remote device of the other user. In some situations, the information might also be automatically deleted from the remote device 126, but in other situations, the information might remain on both the remote device 126 and the other user's remote device (e.g. the devices of two family members who are sharing the vehicle 104).

The software application 128 can provide other helpful information as well, such as a frequently asked questions page and a helpdesk chat interface.

In some implementations, the above-described interactions with the remote device 126 and the software application 128 might only occur when the remote device 126 is within Bluetooth® range and/or have a Wi-Fi connection. Further, in some implementations, the system 100 can send notifications to the remote device 126 via another device (not shown), such as a Wi-Fi wall adapter or other device that has a Wi-Fi connection. To facilitate this, the other device can be plugged in to a 110 V power outlet and can be configured to be connected to a Wi-Fi network (e.g., a home of the vehicle owner). As such, the system 100 can have a Wi-Fi connection by communicating with the other device via Bluetooth® and can send notifications to the remote device 126 as long as the remote device 126 has a type of wireless signal (e.g., cell service or a Wi-Fi connection of its own). Other examples are possible as well.

The system 100 described above can provide various advantages over existing backup systems. For example, existing systems can include a main vehicle battery integrated with wireless jump-starting capabilities, but such systems might not provide self-maintaining capabilities and/or trickle charging capabilities integrated within or with a single housing and system that can be installed in or on a vehicle. Further, such existing systems can be limited to particular markets (e.g., the automotive market) and might require more maintenance than desired. Some existing systems can include a jump starter accessory that is portable and separate from a main battery of a vehicle. Some existing systems also have limited battery sizes or otherwise are only able to be used in certain vehicles. And some existing systems also must be manually charged on a regular basis and manually connected/disconnected from a vehicle on a regular basis.

By contrast, the system 100 serves as a separate, smart, self-maintaining, adaptable accessory that can be installed into a large variety of vehicles across multiple markets (e.g., cars, trucks, lawnmowers, golf carts, etc.), connected to an existing main battery of a vehicle, can be ready for use as an at least partially autonomous jump starter, self-maintainer, and/or trickle charger as-needed because such functionality is integrated therein, and can function as a cheaper, streamlined, less complex, and more permanent accessory requiring less maintenance than existing systems. For instance, by having an intelligent controller that monitors charge states of the main battery and the disclosed system's own lithium-ion battery, as well as automatically initiates charging of the main battery or lithium-ion battery in response to certain conditions being met, the disclosed system can reduce or eliminate the need for a user to manually monitor these charge states or perform other manual maintenance on the main battery or the disclosed system. The system 100 is also designed to be installed in such a way that the system 100 remains on or within the vehicle 104 during most if not all of the vehicle's operations, including when the vehicle 104 is travelling, when the vehicle 104 is not travelling (e.g., in a garage), when the vehicle 104 is idle, etc., thus making the system 100 a permanent or semi-permanent component of the vehicle 104. Other advantages are possible as well.

Figure 2:
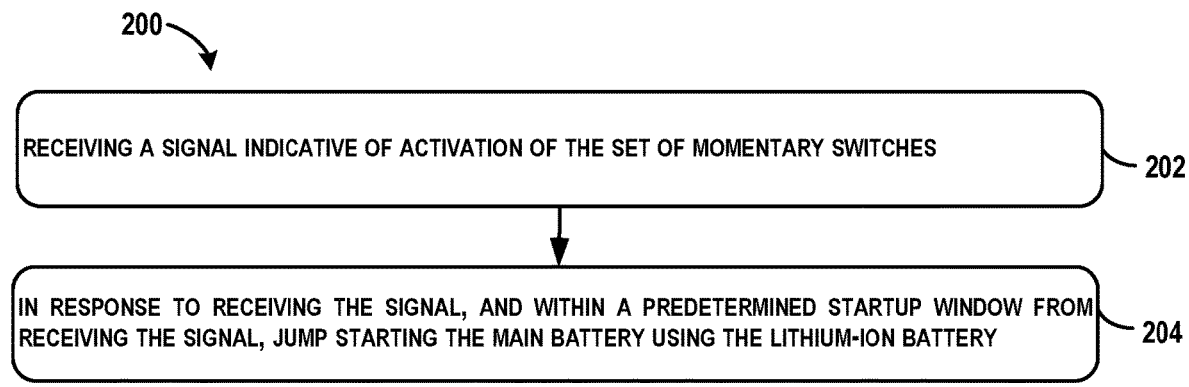
FIG. 2 is a flow chart depicting example operations, in accordance with an example embodiment.

FIG. 2 is a flow chart depicting an example of a method 200, in accordance with an example embodiment. In particular, the flow chart of FIG. 2 depicts example operations relating to the jump-starting operations described above. Method 200 may include one or more operations, functions, or actions as illustrated by one or more of blocks 202-204.

At block 202, functions include receiving a signal indicative of activation of the set of momentary switches.

At block 204, functions include in response to receiving the signal, and within a predetermined startup window from receiving the signal, jump starting the main battery using the lithium-ion battery.

Figure 3:
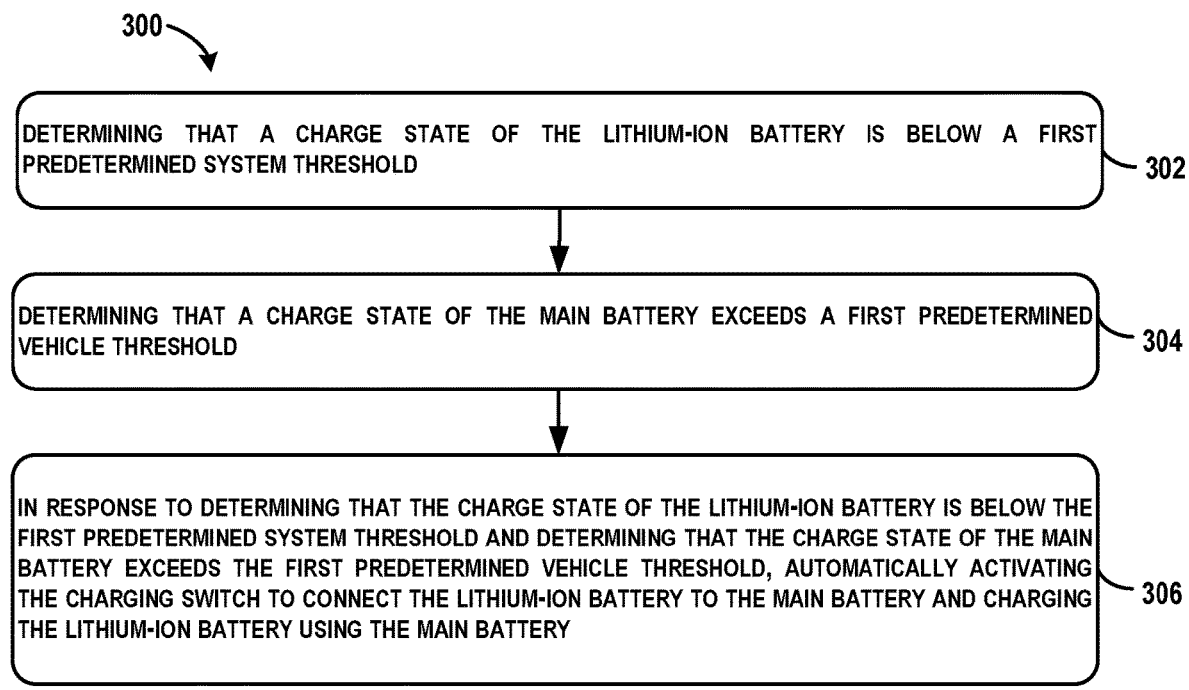
FIG. 3 is another flow chart depicting example operations, in accordance with an example embodiment.

FIG. 3 is another flow chart depicting example operations, in accordance with an example embodiment. In particular, the flow chart of FIG. 3 depicts example operations relating to the self-maintaining operations described above. Method 300 may include one or more operations, functions, or actions as illustrated by one or more of blocks 302-306.

At block 302, functions include determining that a charge state of the lithium-ion battery is below a first predetermined system threshold.

At block 304, functions include determining that a charge state of the main battery exceeds a first predetermined vehicle threshold.

At block 306, functions include in response to determining that the charge state of the lithium-ion battery is below the first predetermined system threshold and determining that the charge state of the main battery exceeds the first predetermined vehicle threshold, automatically activating the charging switch to connect the lithium-ion battery to the main battery and charging the lithium-ion battery using the main battery.

Devices or systems may be used or configured to perform logical functions presented in FIGS. 2 and 3. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Although the operations in FIGS. 2 and 3 are illustrated in a sequential order, these operations may also be performed in parallel, and/or in a different order than those described herein. Also, the operations may be combined, divided, and/or removed based upon the desired implementation.

Furthermore each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIGS. 2 and 3 may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

Any one or more of the jump-starting, self-maintaining, trickle charging, and/or main battery maintaining operations described above can be represented as a block in a method that is performed by the controller 110.

Figure 4:
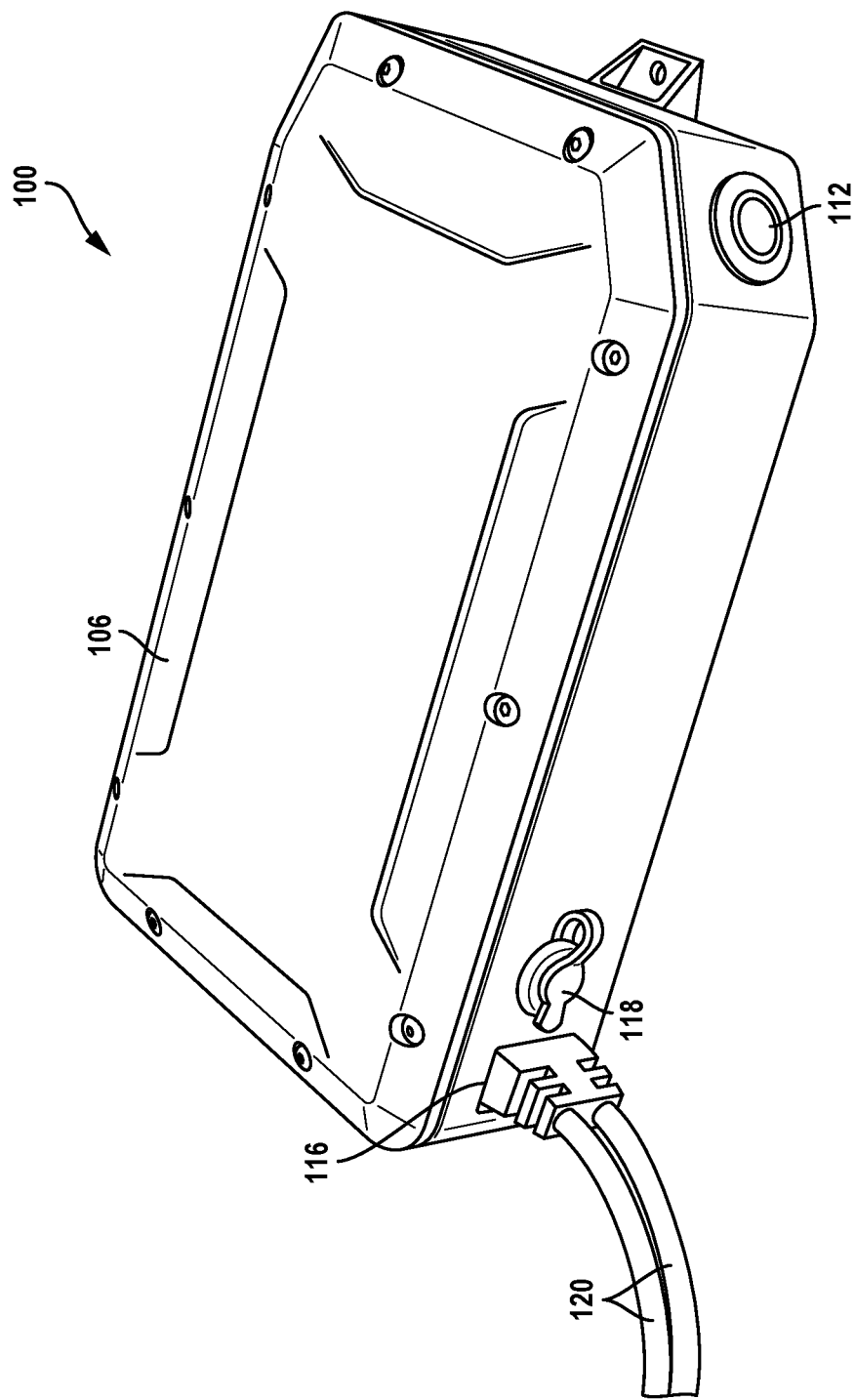
FIG. 4 depicts an example of the system of FIG. 1, in accordance with an example embodiment.

FIG. 4 depicts an example of the system 100, in accordance with an example embodiment. In particular, FIG. 4 depicts the housing 106 (which is closed), the plurality of first charging ports 116, the second charging port 118, the plurality of first cables 120, and an example form that one of the set of momentary switches 112 can take—namely, a manually-activated push button.

Figure 5:
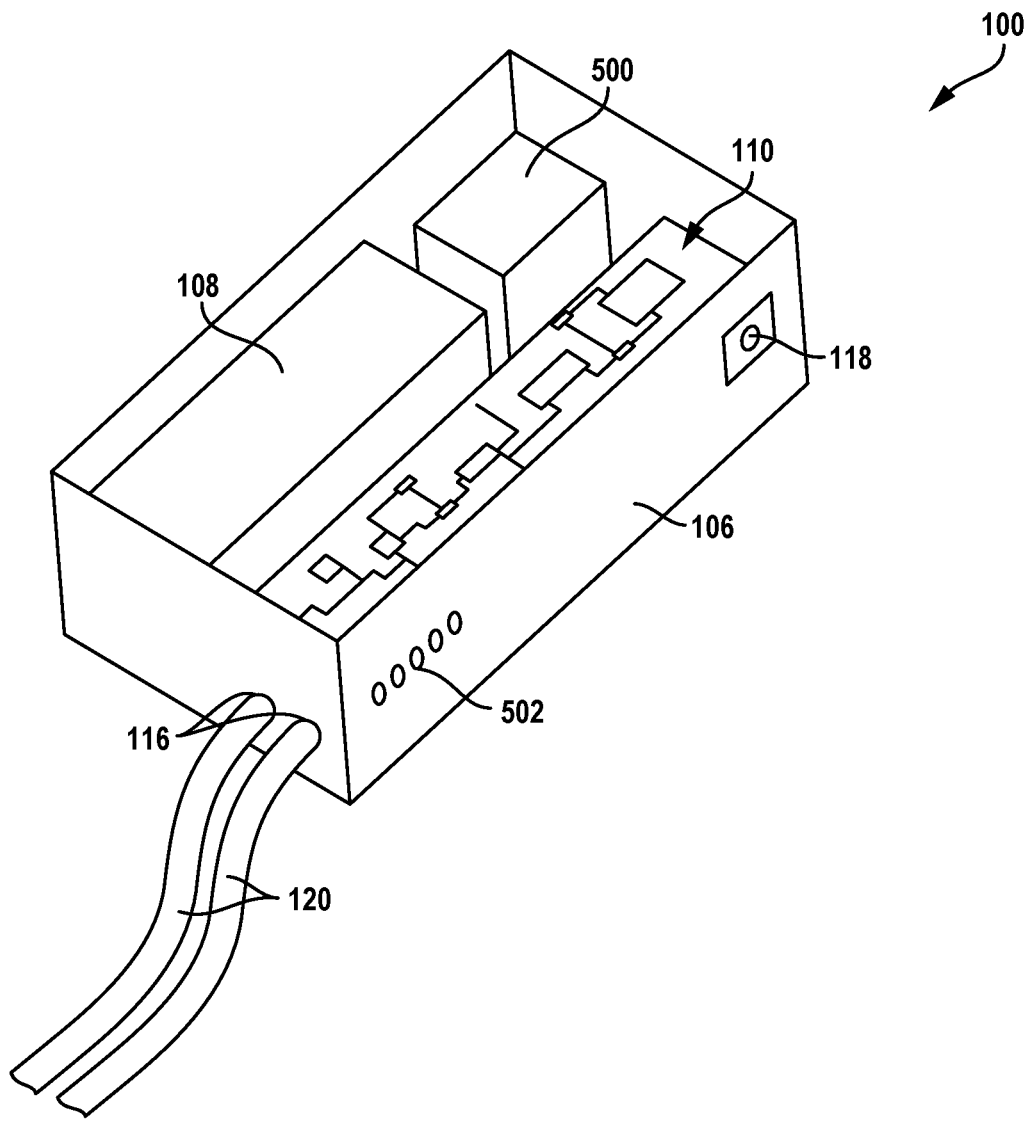
FIG. 5 depicts another example of the system of FIG. 1, in accordance with an example embodiment.

FIG. 5 depicts another example of the system 100, in accordance with an example embodiment. In particular, FIG. 5 depicts the system 100 where a lid of the housing 106 is removed and components within the housing 106 are in view. As shown, FIG. 5 depicts the lithium-ion battery 108, the controller 110, the plurality of first charging ports 116, the second charging port 118, and the plurality of first cables 120. In addition, FIG. 5 depicts a wireless communication module 500 (e.g., Bluetooth® module) that can be disposed within the housing 106 and can be connected to, or be integrated as part of, the controller 110. Further, FIG. 5 depicts a plurality of LEDs 502 that indicate a charge state of the lithium-ion battery 108.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

By the term "substantially," "approximately," or "about" used herein, it is meant that the recited characteristic, parameter, value, or geometric planarity need not be achieved exactly, but that deviations or variations, including for example, tolerances, measurement error, measurement accuracy limitations and other factors known to skill in the art, may occur in amounts that do not preclude the effect the characteristic was intended to provide.

What is claimed is:

1. A system comprising:
    a housing;
    a lithium-ion battery disposed at least partially within the housing, wherein the housing defines a plurality of first charging ports configured to receive a plurality of first cables that connect the lithium-ion battery to a main battery of a vehicle; and
    a controller disposed at least partially within the housing and including a set of momentary switches and a charging switch,
    wherein the set of momentary switches are configured such that, when the set of momentary switches are activated, the set of momentary switches connect the lithium-ion battery in parallel with the main battery,
    wherein the charging switch is configured such that, when the charging switch is activated, the charging switch connects the lithium-ion battery to the main battery,
    wherein the controller is configured to perform a set of jump-starting operations comprising:
        receiving a signal indicative of activation of the set of momentary switches, and
        in response to receiving the signal, and within a predetermined startup window from receiving the signal, jump starting the main battery using the lithium-ion battery, and wherein the controller is further configured to perform a set of self-maintaining operations comprising:
determining that a charge state of the lithium-ion battery is below a first predetermined system threshold,
determining that a charge state of the main battery exceeds a first predetermined vehicle threshold, and
in response to determining that the charge state of the lithium-ion battery is below the first predetermined system threshold and determining that the charge state of the main battery exceeds the first predetermined vehicle threshold, automatically activating the charging switch to connect the lithium-ion battery to the main battery and charging the lithium-ion battery using the main battery.

2. The system of claim 1, wherein the set of jump-starting operations further comprise:
discontinuing jump starting the main battery when the predetermined startup window expires.

3. The system of claim 1, wherein the set of self-maintaining operations further comprise:
determining that the main battery has exhibited a rise in voltage exceeding a predetermined voltage rise threshold,
wherein the controller is configured to perform the self-maintaining operations of determining that the charge state of the lithium-ion battery is below the first predetermined system threshold and determining that the charge state of the main battery exceeds the first predetermined vehicle threshold automatically in response to determining that the main battery has exhibited the rise in voltage exceeding the predetermined voltage rise threshold.

4. The system of claim 1, wherein the set of self-maintaining operations further comprise:
determining that the charge state of the lithium-ion battery exceeds a second predetermined system threshold, and
in response to determining that the charge state of the lithium-ion battery exceeds the second predetermined system threshold, automatically deactivating the charging switch to disconnect the lithium-ion battery to the main battery and stop charging the lithium-ion battery using the main battery.

5. The system of claim 1, wherein the set of self-maintaining operations further comprise:
determining that the charge state of the main battery is below a second predetermined vehicle threshold, and
in response to determining that the charge state of the main battery is below the second predetermined vehicle threshold, automatically deactivating the charging switch to disconnect the lithium-ion battery to the main battery and stop charging the lithium-ion battery using the main battery.

6. The system of claim 1, wherein the controller is configured to perform the set of self-maintaining operations on a continuous basis.

7. The system of claim 1, wherein the set of jump-starting operations further comprise:
determining that the charge state of the main battery is below a predetermined charge drop threshold, and
in response to determining that that the charge state of the main battery is below the predetermined charge drop threshold, transmitting, to a remote device having installed thereon a software application associated with the system, an alert message indicating that the main battery is being depleted.

8. The system of claim 1, wherein receiving the signal indicative of activation of the set of momentary switches comprises receiving the signal over a wireless interface between the controller and a remote device having installed thereon a software application associated with the system.

9. The system of claim 1, wherein the system is configured to be fixedly attached to a location within the vehicle and connected to the main battery of the vehicle such that the system is connected to the main battery while the vehicle is travelling and while the vehicle is not travelling.

10. The system of claim 9, wherein the housing further defines a second charging port configured to receive a second cable that connects the lithium-ion battery to an external power source and electrically couples the main battery to the external power source via the system, and
wherein the controller is further configured to trickle charge the main battery using the external power source.

11. A system comprising:
a housing;
a lithium-ion battery disposed at least partially within the housing, wherein the housing defines a plurality of first charging ports configured to receive a plurality of first cables that connect the lithium-ion battery to a main battery of a vehicle, and wherein the housing further defines a second charging port configured to receive a second cable that connects the lithium-ion battery to an external power source and electrically couples the main battery to the external power source via the system; and
a controller disposed at least partially within the housing and including a charging switch,
wherein the charging switch is configured such that, when the charging switch is activated, the charging switch connects the lithium-ion battery to the main battery,
wherein the controller is configured to perform a set of self-maintaining operations comprising:
determining that a charge state of the lithium-ion battery is below a first predetermined system threshold,
determining that a charge state of the main battery exceeds a first predetermined vehicle threshold, and
in response to determining that the charge state of the lithium-ion battery is below the first predetermined system threshold and determining that the charge state of the main battery exceeds the first predetermined vehicle threshold, automatically activating the charging switch to connect the lithium-ion battery to the main battery and charging the lithium-ion battery using the main battery, and
wherein the controller is further configured to trickle charge the main battery using the external power source.

12. The system of claim 11, wherein the set of self-maintaining operations further comprise:
determining that the main battery has exhibited a rise in voltage exceeding a predetermined voltage rise threshold,
wherein the controller is configured to perform the self-maintaining operations of determining that the charge state of the lithium-ion battery is below the first predetermined system threshold and determining that the charge state of the main battery exceeds the first predetermined vehicle threshold automatically in response to determining that the main battery has exhibited the rise in voltage exceeding the predetermined voltage rise threshold.

13. The system of claim 11, wherein the set of self-maintaining operations further comprise:
determining that the charge state of the lithium-ion battery exceeds a second predetermined system threshold, and in response to determining that the charge state of the lithium-ion battery exceeds the second predetermined system threshold, automatically deactivating the charging switch to disconnect the lithium-ion battery to the main battery and stop charging the lithium-ion battery using the main battery.

14. The system of claim 11, wherein the set of self-maintaining operations further comprise:
    determining that the charge state of the main battery is below a second predetermined vehicle threshold, and
    in response to determining that the charge state of the main battery is below the second predetermined vehicle threshold, automatically deactivating the charging switch to disconnect the lithium-ion battery to the main battery and stop charging the lithium-ion battery using the main battery.

15. The system of claim 11, wherein the controller is configured to perform the set of self-maintaining operations on a continuous basis.

16. A method comprising:
    determining, by a controller, that a charge state of a lithium-ion battery is below a first predetermined system threshold, wherein the lithium-ion battery and the controller are disposed at least partially within a housing, wherein the housing defines a plurality of first charging ports configured to receive a plurality of first cables that connect the lithium-ion battery to a main battery of a vehicle, and wherein the housing further defines a second charging port configured to receive a second cable that connects the lithium-ion battery to an external power source and electrically couples the main battery to the external power source;
    determining, by the controller, that a charge state of the main battery exceeds a first predetermined vehicle threshold, and
    in response to determining that the charge state of the lithium-ion battery is below the first predetermined system threshold and determining that the charge state of the main battery exceeds the first predetermined vehicle threshold, automatically activating a charging switch to connect the lithium-ion battery to the main battery and charging the lithium-ion battery using the main battery.

17. The method of claim 16, further comprising:
    trickle charging, by the controller, the main battery using the external power source.

18. The method of claim 16, wherein the controller includes including a set of momentary switches that are configured such that, when the set of momentary switches are activated, the set of momentary switches connect the lithium-ion battery in parallel with the main battery, the method further comprising:
    receiving, by the controller, a signal indicative of activation of the set of momentary switches; and
    in response to receiving the signal, and within a predetermined startup window from receiving the signal, jump starting, by the controller, the main battery using the lithium-ion battery.

19. The method of claim 16, further comprising:
    determining, by the controller, that the main battery has exhibited a rise in voltage exceeding a predetermined voltage rise threshold,
    wherein determining that the charge state of the lithium-ion battery is below the first predetermined system threshold and determining that the charge state of the main battery exceeds the first predetermined vehicle threshold are performed automatically in response to determining that the main battery has exhibited the rise in voltage exceeding the predetermined voltage rise threshold.

20. The method of claim 16, further comprising:
    determining, by the controller, that the charge state of the lithium-ion battery exceeds a second predetermined system threshold, and
    in response to determining that the charge state of the lithium-ion battery exceeds the second predetermined system threshold, automatically deactivating, by the controller, the charging switch to disconnect the lithium-ion battery to the main battery and stop charging the lithium-ion battery using the main battery.

* * * * *